2,948,678
Patented Aug. 9, 1960

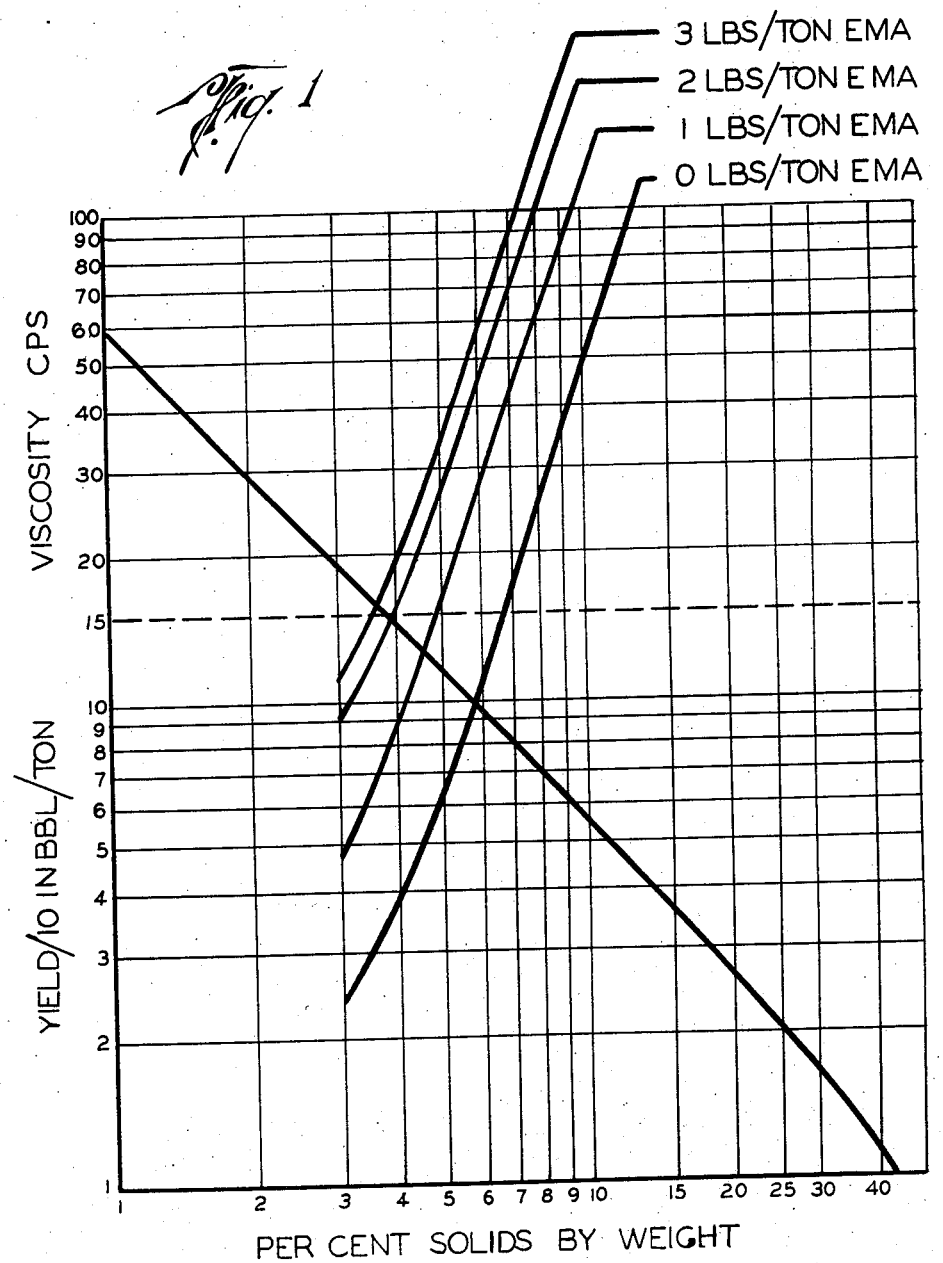

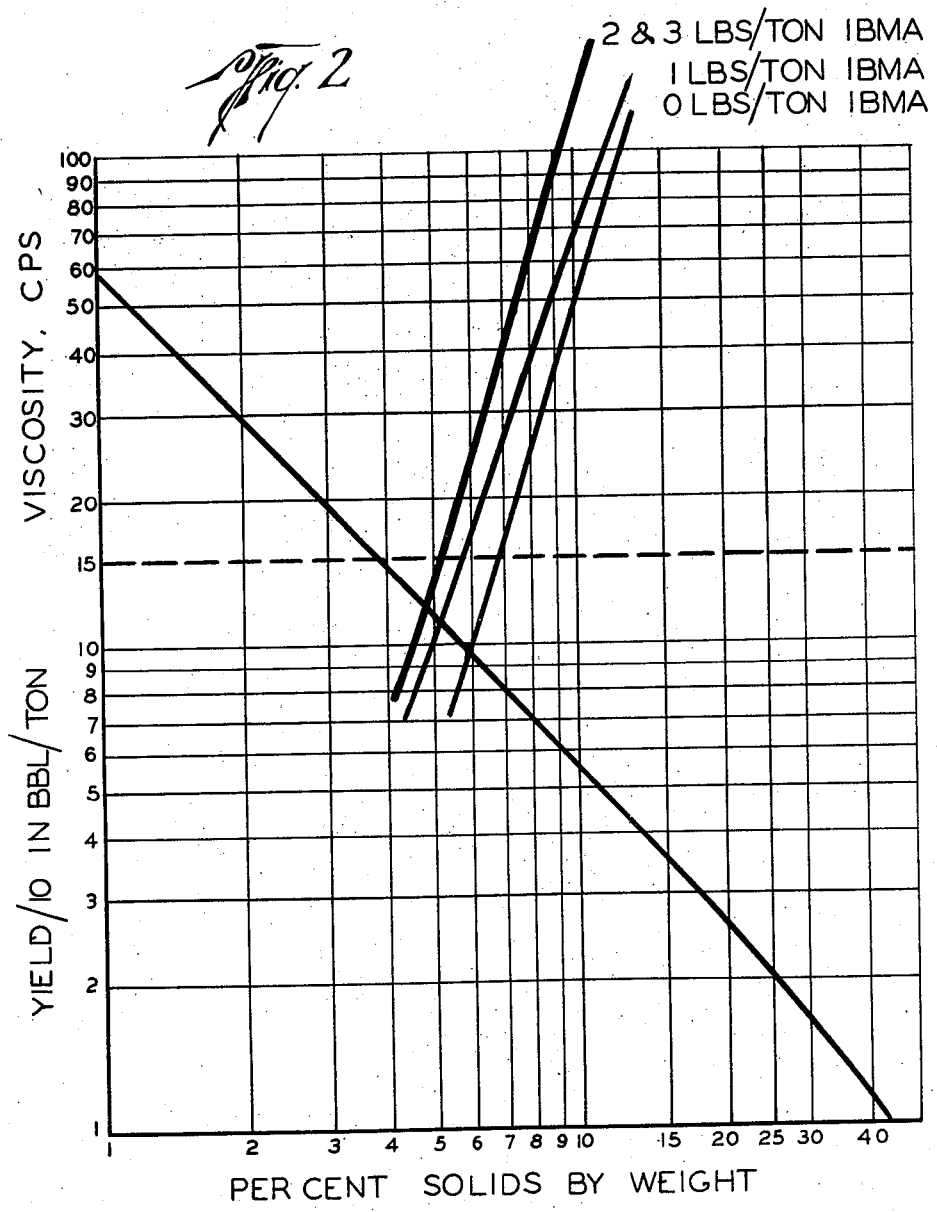

2,948,678
BENEFICIATED CLAY COMPOSITIONS AND METHOD OF BENEFICIATING CLAY

Finis Turner and Edward T. Dillon, Houston, Tex., assignors to Magnet Cove Barium Corporation, Houston, Tex.

Filed Aug. 5, 1957, Ser. No. 676,190

14 Claims. (Cl. 252—8.5)

This invention relates to methods for treating bentonitic clays to increase their yield. In another of its aspects, it relates to beneficiating bentonitic clay compositions particularly useful in the preparation and maintenance of well drilling muds.

The yield of a clay is defined as the number of barrels (42 gallons per barrel) of aqueous dispersion or mud, having a viscosity of 15 centipoises, which can be prepared from a ton of clay. Thus the yield is a quality index, insofar as the preparation of mud is concerned, and many purchasers require that a bentonite yield at least 90 barrels of 15 centipoises mud per ton of clay. Such a yield is not at all uncommon for the purer forms of sodium bentonite, such as Wyoming bentonite, but is not attained by the calcium and other meta- or sub-bentonites. The yield for these is usually on the order of 30 to 35 barrels and that for many impure sodium bentonites is 50 or 60 or lower.

There exist many deposits of calcium bentonite and other sub-bentonites which are not acceptable to purchasers requiring a minimum yield of 90 barrels per ton. Efforts have been made to increase the yield of the sub-bentonites, such as by base exchanging the calcium ions with the sodium ions so as to convert the sub-bentonite to higher yielding sodium bentonite. This has not always been successful by any means, probably because the base exchange cannot be forced to completion in a practical manner. Thus the saleability of the sub-bentonite as a mud-making material is quite limited and it would be desirable to possess a method for beneficiating these sub-bentonites so as to make them saleable competitively with ordinary sodium bentonites.

Further, sodium bentonite is usually added to a mud because of its pronounced colloidal, thixotropic and beneficial wall-building properties. When a mud of a preselected viscosity is desired, a certain percentage of sodium bentonite solids will be added to obtain that viscosity. It is therefore apparent that the cost of the mud varies with the yield of the sodium bentonite. Accordingly, it would be desirable to possess a method for beneficiating sodium bentonite so that lesser quantities of it could be used in preparing a mud of a given viscosity.

It is accordingly an object of this invention to provide a method of beneficiating a clay of the bentonite or montmorillonite group so as to increase its yield, the beneficiation at least in part being obtained by adding certain copolymers to the clay.

Another object of the invention is to provide a beneficated clay composition in which the yield of a clay of the montmorillonite group is increased by treating the same with an ethylene-maleic anhydride or a butylene-maleic anhydride copolymer.

Another object of the invention is to provide a method for beneficiating calcium montmorillonite by the joint action of base exchange and treatment with such an organic copolymer.

Another object of the invention is to provide a method for beneficiating calcium montmorillonite to render the same more competitive with sodium bentonite.

Other objects, advantages and features of this invention will be apparent to one skilled in the art upon consideration of the specification, claims and drawings, wherein:

Fig. 1 is a viscosity-yield curve illustrating the increase in yield of a calcium montmorillonite type of clay with treatment by soda ash and one of the copolymers of this invention; and Fig. 2 is a curve similar to Fig. 1 except showing the treatment results for a different copolymer.

In accordance with this invention, the yield of a clay is increased by treating the same with a water-soluble copolymer selected from the class consisting of ethylene-maleic anhydride copolymers and butylene-maleic anhydride copolymers. Such treatment is employed to beneficiate sodium montmorillonite type of clays simply by adding the copolymers to such clays. However, it is usually economically more desirable to beneficiate calcium montmorillonite clays and in such case, the copolymer is used in conjunction with sodium carbonate (soda ash) or other alkali metal compounds having an anion capable of reacting with the calcium to form an insoluble precipitate. When so treating the calcium montmorillonite type of clay, it has been found that the yield thereof in many cases can be at least doubled, even though very small quantities of the beneficiating agents are employed. The clay so beneficiated can be used in ordinary manner that conventional Wyoming bentonite, for example, is employed to give substantially the same results in a drilling mud. Such muds are susceptible to treatment with other agents, such as thinners, fluid loss reducers, as well as being weighted in the came manner as conventional Wyoming bentonite type muds.

The beneficiating agent or agents can be added to the clay in any desired manner to obtain the results of this invention. From a practical standpoint, it will ordinarily be preferred to add the agents to the clay as the same is being ground. The resulting dry product can then be sacked in a conventional manner, after drying if required. However, if desired, the clay and beneficiating agents can be separately added to water to form a slurry, the agent and clay being added in any desired order. This type of wet mixing could be employed, for example, at the well site, but ordinarily it would not be preferred and they will not be used because the beneficiation in the dry form prior to sacking the clay permits closer quality control and a more uniform product.

The clays to which this invention is applicable to beneficiate can be termed the montmorillonite or bentonite group, which group is well known to those skilled in the art. As species of this group, there may be named montmorillonite, beidellite, nontronite, hectorite and saponite. Some of these clays are presently too expensive for use in drilling muds, but nevertheless are susceptible to having their yield increased by the practice of this invention. As a practical matter, the invention will find its widest application in conjunction with the beneficiation of the calcium bentonite or calcium montmorillonite. This clay, in the raw state, usually has a rather low yield of the order of 30 to 35 barrels per ton and will desirably be beneficiated until its yield exceeds 90 barrels per ton so as to meet the minimum specifications of many purchasers.

While sodium bentonite or sodium montmorillonite usually meets these minimum specifications, it too can be upgraded by adding the copolymers of this invention. Such will even further increase its yield and for those sodium bentonites having a yield below the minimum, they can be upgraded to have a yield above the minimum.

In the claims the terms "montmorillonite type" or

"bentonite type" will be understood to include all of the clays above-named as falling within said group while "montmorillonite" or "bentonite" will be understood to refer to the first-named clay of said group, i.e. montmorillonite per se.

The copolymers employed are selected, as indicated above, from the group consisting of ethylene-maleic anhydride copolymers and butylene-maleic anhydride copolymers and admixtures thereof. The molecular weight of copolymers of this type is usually expressed in terms of specific viscosity which, for the purposes of this specification and claims, will be defined as being determined at 25° C. on a 1% by weight solution of the anhydride form of the copolymer in dimethylformamide. For the ethylene-maleic anhydride copolymer, the lower limit of specific viscosity should be 0.1 and all values of specific viscosities above this value will have beneficial effects upon the clay. The upper limit of molecular weight will be determined by the highest molecular weight polymer which can be synthesized. Based upon presently available molecular weights of this copolymer, the specific viscosity range can be said to be 0.1 to 4.02. However, for this particular copolymer, it has been noted that while all specific viscosities above 0.1 have beneficial effects, the degree of the effect varies with the specific viscosity. For example, where small amounts of the copolymer are employed (3 lbs. per ton of clay or less), a peak in the yield of the clay seems to occur at a specific viscosity of about 0.4, specific viscosities higher and lower than this value not increasing the yield of the clay to such a large extent. It is emphasized however, that all specific viscosities above 0.1 beneficiate the clay. Accordingly, since small amounts of the copolymer will desirably be used for economical reasons, it will ordinarily be preferred to use a specific viscosity of 0.4. For amounts of the copolymer of about 4 pounds per ton of clay and greater, the yield peak was not noted with a change in specific viscosity, the yield increasing with specific viscosity. Therefore where such larger amounts of the copolymer are to be used, it will ordinarily be preferred to use one having as high a specific viscosity as can be obtained.

Isobutylene-maleic anhydride copolymer is apparently not quite as efficient as the ethylene-maleic anhydride copolymer and the lower limit of its specific viscosity at which appreciable clay beneficiation occurs is about 0.5. Here again the upper limit of specific viscosity or molecular weight is that which is obtainable. For this particular copolymer, the yield of the clay increases with increasing specific viscosity of the copolymer until it reaches a peak at about a specific viscosity of 1.0 after which the yield decreases with increasing specific viscosity. This seems to be true for all concentrations of the copolymer. Accordingly a specific viscosity of 1.0 is preferred. However, copolymers having specific viscosities of 0.5 or above all beneficiated the clay and increased its yield. For the purpose of stating a numerical range, the specific viscosity can be stated to be between 0.5 and 2.8, the latter being the maximum presently available.

The amount of the copolymer to be added to the clay will depend upon the extent of beneficiation desired, and this is particularly true for the ethylene-maleic anhydride copolymer. Very small amounts can be employed and amounts within the range of 0.1 to 10 pounds per ton of clay, preferably 0.25 to 5 pounds per ton of clay, will achieve desired results. Expressed in another way, the amount will usually be that which is required to increase the yield of the clay to a desired value, e.g. 90 barrels per ton.

The olefin-maleic anhydride copolymers useful in this invention are readily prepared by techniques well known in the art, such as, for example, the methods described in U. S. Patent 2,378,629. Generally the copolymers are prepared by reacting the ethylene or isobutylene or butylene with maleic anhydride in the presence of a peroxide catalyst and an aliphatic or aromatic hydrocarbon which is a solvent for the monomers but is a non-solvent for the copolymer formed. Suitable solvents include benzene, toluene, xylene, chlorinated benzene, hexane, acetone, ethylene dichloride, and the like. While benzoyl peroxide is the preferred catalyst, other peroxides such as acetyl peroxide, butyryl peroxide, di-tertiary-butyl peroxide, lauroyl peroxide and the like are all satisfactory since they are soluble in organic solvents. The copolymer contains substantially equimolar quantities of the olefin residue and the maleic anhydride residue. The properties of the polymer such as molecular weight, for example, can be regulated by proper choice of the catalyst and control of one or more of the variables such as the ratio of reactants, temperature, and catalyst concentration. Molecular weight control is also effectively achieved by including in the polymerization mixture regulators such as phosphites, hydrocarbon carboxylic acids free from aliphatic unsaturation and having at least one hydrogen atom attached to an alpha-carbon atom, a mixture of (a) benzene, a halobenzene, or a haloparaffin with (b) an alkylated aromatic hydrocarbon having at least one alpha-carbon atom, aldehydes free from non-hydrocarbon substituents, mercaptans, and the like. The copolymer product is obtained in a solid form and is easily recovered by filtration, centrifugation or the like. Removal of any residual or adherent solvent can be effected by evaporation using moderate heating.

Particularly useful as the clay beneficiating agents of the invention are various derivatives of the olefin-maleic anhydride copolymers such as the acid, the partial acid, the salts, the partial salts, the partial esters, the imides, the partial imides, the amides, the partial amides, and the like. Of these, the alkali metal (sodium, potassium and lithium) salts are greatly preferred. These are prepared by the common techniques well known to those skilled in the art. For example, the copolymers formed by the above procedure are in the anhydride form and are readily hydrolyzed by heating with water to yield the acid form of the copolymer having the structure

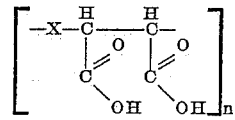

wherein X is the olefinic residue, that is, the ethylenic or the isobutylenic residue, and n is the number of repeating units of the polymer.

The alkali metal, alkaline earth metal, ammonium or quaternary ammonium salts can be readily obtained by reacting the copolymer in its anhydride or acid form with the stoichiometric amount of the corresponding hydroxide. Alkali metal salts of the copolymers such as sodium, potassium, and lithium salts, alkaline earth metal salts such as barium and calcium salts, the ammonium salt and the benzyl trimethyl ammonium salt which can be prepared in this manner are useful in the invention. Partial salts may, of course, be produced by using less than the quantity of alkali required to effect complete conversion of the carboxyl groups. Similarly, other salts of the copolymers, i.e. the di- or partial salts of amines, such as methylamine, triethylamine, diethanolamine, pyridine, piperidine, and morpholine salts, are effective clay beneficiating agents, although not as effective as the alkali metal salts.

Also useful, but not as preferred as the alkali metal salts, is the half-amide, half-ammonium salt form having the structure

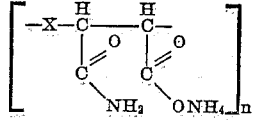

where X is the olefinic residue and n is the number of repeating units in the polymer. These products can be made by contacting particles of finely divided copolymer with ammonia gas at room or elevated temperatures. The reaction is exothermic and it is desirable to suspend the copolymer particles in an inert organic liquid (e.g. benzene) and bubbling ammonia through the slurry.

The half-amide, half-ammonium salt can be converted to the imide derivative by heating at a temperature from about 60° to about 150° C.

It will be appreciated that the acid form of the copolymer can be used and it will react in situ with alkali metal ions in the clay or in the drilling mud to convert the same to the alkali metal salts of the copolymer. However, it is usually preferred to add the alkali metal salts per se in order to obtain more uniform results.

When a calcium montmorillonite type of clay is to be beneficiated, it has been found the copolymers are most effective when used in conjunction with an alkali metal compound which is water-soluble, ionizable and has an anion capable of reacting with calcium to form a water-insoluble precipitate. A preferred species is soda ash or sodium carbonate. Other species which are less preferred, primarily because of their costs, include the alkali metal hypophosphates, oxalates, phosphates, silicates, sulfites and tartrates. It is thought that the function of this ingredient is to furnish sodium ions for base exchange with the calcium ions of the calcium montmorillonite converting the latter to the sodium montmorillonite form. However, for practical operation, such base exchange is not complete enough to convert the calcium montmorillonite to true sodium montmorillonite such as Wyoming bentonite so that the copolymers of this invention are used to further increase the yield of the clay.

The amount of the alkali metal compound employed will be somewhat dependent upon the concentration of the calcium montmorillonite types in the total clay. It has been found that from 1 to 7 percent by weight of the clay of soda ash is an operable range with 3 to 7 percent being more preferred and about 5 percent being still more preferred. Actually, 7 percent obtains maximum results but a slightly greater amount than this acts to reduce the yield of the clay and hence, to allow some latitude in operation, a slightly smaller amount than 7 percent is usually to be employed. For the other alkali metal compounds, stoichiometric equivalents to the soda ash can be employed but for a practical range, it can be stated that from 1 to 7 percent can be used for all of these.

Referring now to drawings, Fig. 1 shows results obtained by treating a relatively pure calcium montmorillonite with ethylene-maleic anhydride copolymer, converted to the sodium salt, and having a specific viscosity of 2.34. The clay was also treated with 4 percent by weight of soda ash on a total dry solids basis. From these curves it will be noted that the raw clay with 4 percent soda ash but without the copolymer had a yield of between 83 and 84 barrels per ton. However, with treatment of 3 pounds per ton of ethylene-maleic anhydride copolymer, the yield was increased to over 155 barrels per ton. Other data, not plotted, showed that when about 7 pounds per ton of the ethylene-maleic anhydride copolymer is used, the yield of the clay was on the order of 180 barrels per ton. Also, increasing the amount of sodium carbonate employed still further increases the yield.

Fig. 2 is a plot similar to that of Fig. 1 except that the data was obtained by substituting isobutylene-maleic anhydride copolymer (sodium salt) for the ethylene-maleic anhydride copolymer, the amount of sodium carbonate and procedural manipulations beign otherwise the same.

In another series of tests, propylene-maleic anhydride copolymer (sodium salt) was added to the same calcium montmorillonite-4 percent soda ash system in amounts ranging up to 3 pounds per ton. The clay-soda ash, without the propylene-maleic anhydride copolymer, had a yield of about 82 barrels per ton and with three pounds per ton of the copolymer added thereto, the yield had increased to only about 86 barrels per ton. Amounts of the copolymer less than 3 pounds per ton showed even less increase in yield.

From the foregoing it will be seen that this invention is one well adapted to attain all of the ends and objects hereinabove set forth, together with other advantages which are obvious and which are inherent to the composition and method.

It will be understood that certain features and subcombinations are of utility and may be employed without reference to other features and subcombinations. This is contemplated by and is within the scope of the claims.

The invention having been described, what is claimed is:

1. A composition for use in the production of viscous clay slurries comprising a calcium montmorillonite clay, soda ash in an amount within the range of 1 to 7 percent by weight of said clay, and from 0.1 to 10 pounds per ton of clay of a copolymer selected from the group consisting of ethylene-maleic anhydride copolymer having a specific viscosity of at least 0.1 and isobutylene-maleic anhydride copolymer having a specific viscosity of at least 0.5.

2. A composition for use in the production of viscous clay slurries comprising calcium montmorillonite clay, soda ash in an amount with the range of 3 to 7 percent by weight of said clay, and from 0.25 to 5 pounds per ton of clay of an ethylene-maleic anhydride copolymer having a specific viscosity of at least 0.1.

3. The composition of claim 2 wherein the specific viscosity of the copolymer is about 0.4.

4. A composition for use in the production of viscous clay slurries comprising calcium montmorillonite clay, soda ash in the range of 3 to 7 percent by weight of said clay and from 0.25 to 5 pounds per ton of clay of isobutylene-maleic anhydride copolymer having a specific viscosity of at least 0.5.

5. The composition of claim 4 wherein the copolymer has a specific viscosity of approximately 1.

6. A composition for use in the production of viscous clay slurries comprising a calcium montmorillonite clay, a water-soluble ionizable alkali metal compound having an anion capable of reacting with calcium ions to form a water-insoluble precipitate, said compound being present in amount of 1 to 7 percent by weight of said clay, and from 0.1 to 10 pounds per ton of clay of a copolymer selected from the group consisting of ethylene-maleic anhydride copolymer having a specific viscosity of at least 0.1 and butylene-maleic anhydride copolymer having a specific viscosity of at least 0.5.

7. A composition for use in the production of viscous clay slurries comprising sodium bentonite and from 0.1 to 10 pounds per ton of said bentonite of a copolymer selected from the group consisting of ethylene-maleic anhydride copolymer having a specific viscosity of at least 0.1 and butylene-maleic anhydride copolymer having a specific viscosity of at least 0.5.

8. The composition of claim 7 wherein the copolymer is present within the range of 0.25 to 5 pounds per ton of bentonite and is ethylene maleic anhydride copolymer having a specific viscosity of at least 0.1.

9. The composition of claim 7 wherein the copolymer is present in the amount in the range of 0.25 to 5 pounds per ton of bentonite and is isobutylene-maleic anhydride copolymer having a specific viscosity of at least 0.5.

10. A composition in the production of viscous clay slurries comprising a clay selected from sodium montmorillonite and calcium montmorillonite, from 0.1 to 10 pounds per ton of clay of a copolymer selected from the group consisting of ethylene-maleic anhydride copolymer having a specific viscosity of at least 0.1 and isobutylene-maleic anhydride copolymer having a specific viscosity of at least 0.5, and, when the selected clay is of the calcium montmorillonite type, a water-soluble ionizable alkali metal compound having an anion capable of reacting with a calcium ion to form a water-insoluble precipitate, said compound being present in an amount in the range of 1 to 7 percent by weight of said clay.

11. The process for improving the yield of calcium montmorillonite clay which comprises adding soda ash to said clay in an amount within the range of 1 to 7 weight percent of said clay and also adding from 0.1 to 10 pounds per ton of clay of a copolymer selected from the group consisting of ethylene-maleic anhydride copolymer having a specific viscosity of at least 0.1 and isobutylene-maleic anhydride copolymer having a specific viscosity of at least 0.5.

12. The process of claim 11 wherein the soda ash and copolymer are added to the clay and then the resulting mixture is ground.

13. The process for improving the yield of sodium bentonite which comprises adding thereto from 0.1 to 10 pounds per ton of clay of a copolymer selected from the group consisting of ethylene-maleic anhydride copolymer having a specific viscosity of at least 0.1 and isobutylene-maleic anhydride copolymer having a specific viscosity of at least 0.5.

14. The process for improving the yield of a clay selected from sodium montmorillonite and calcium montmorillonite which comprises adding to said clay from 0.1 to 10 pounds per ton of clay of a copolymer selected from the group consisting of ethylene-maleic anhydride copolymer having a specific viscosity of at least 0.1 and butylene-maleic anhydride copolymer having a specific viscosity of at least 0.5 and, when the clay is of the calcium montmorillonite type, also adding from 1 to 7 weight percent of said clay of a water-soluble ionizable alkali metal compound having an anion capable of reacting with a calcium ion to form a water-insoluble precipitate.

References Cited in the file of this patent

UNITED STATES PATENTS

| | | |
|---|---|---|
| 2,552,775 | Fischer | May 15, 1951 |
| 2,625,529 | Hedrick et al. | Jan. 13, 1953 |
| 2,702,788 | Dawson | Feb. 22, 1955 |
| 2,716,094 | Morrill | Aug. 23, 1955 |
| 2,718,497 | Oldham et al. | Sept. 20, 1955 |
| 2,724,696 | Ratcliffe | Nov. 22, 1955 |
| 2,795,545 | Gluesenkamp | June 11, 1957 |